(12) United States Patent
Siegrist et al.

(10) Patent No.: US 8,927,655 B2
(45) Date of Patent: Jan. 6, 2015

(54) FLAME-RETARDANT MATERIAL COMPRISING A BIOPOLYMER

(75) Inventors: Alexander Siegrist, Wettswill (CH); Per Eriksson, Seyssins (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 13/570,627

(22) Filed: Aug. 9, 2012

(65) Prior Publication Data
US 2013/0203925 A1 Aug. 8, 2013

(30) Foreign Application Priority Data
Aug. 12, 2011 (FR) ...................................... 11 57327

(51) Int. Cl.
C08G 73/02 (2006.01)
C08L 33/06 (2006.01)
C08K 3/22 (2006.01)

(52) U.S. Cl.
CPC .. *C08L 33/06* (2013.01); *C08K 3/22* (2013.01)
USPC ........... 525/185; 524/430; 524/433; 524/436; 524/437; 525/165; 525/186; 525/190; 525/412; 525/445

(58) Field of Classification Search
USPC .......... 524/430, 433, 436, 437; 525/165, 185, 525/186, 190, 412, 445
See application file for complete search history.

(56) References Cited

U.S. PATENT DOCUMENTS

| | | | |
|---|---|---|---|
| 4,525,494 A | 6/1985 | Andy | |
| 6,753,372 B1 * | 6/2004 | Garcia Duran et al. | 524/437 |
| 6,869,985 B2 | 3/2005 | Mohanty et al. | |
| 7,439,283 B2 | 10/2008 | Tanaka et al. | |
| 7,736,560 B2 | 6/2010 | Nelson | |
| 7,767,732 B2 | 8/2010 | Ueda et al. | |
| 7,867,422 B2 | 1/2011 | Nelson et al. | |
| 2003/0216496 A1 | 11/2003 | Mohanty et al. | |
| 2007/0203287 A1 | 8/2007 | Tanaka et al. | |
| 2008/0108729 A1 | 5/2008 | Ueda | |
| 2008/0153941 A1 * | 6/2008 | Fournier et al. | 523/173 |
| 2008/0194739 A1 | 8/2008 | Yamashita et al. | |
| 2011/0101566 A1 | 5/2011 | Yamashita et al. | |

FOREIGN PATENT DOCUMENTS

| | | |
|---|---|---|
| EP | 0 674 627 A1 | 10/1995 |
| EP | 1 361 039 A1 | 11/2003 |
| EP | 1 544 250 A1 | 6/2005 |
| EP | 1 795 561 A1 | 6/2007 |
| EP | 1 816 169 A1 | 8/2007 |
| WO | WO 94/14780 A1 | 7/1994 |
| WO | WO 01/51554 A1 | 7/2001 |
| WO | WO 2008/058020 A2 | 5/2008 |

OTHER PUBLICATIONS

La Rosa, M., et al.; Proceedings of the 57th International Wire & Cable Symposium, 2008, p. 125-133.*
Search Report issued Mar. 15, 2012 in French Patent Application No. 1157327 with English translation of categories of cited documents.

* cited by examiner

*Primary Examiner* — Robert Jones, Jr.
(74) *Attorney, Agent, or Firm* — Oblon, Spivak, McClelland, Maier & Neustadt, L.L.P.

(57) ABSTRACT

Flame-retardant material comprising:
 a matrix comprising, preferably consisting of, at least one organic polymer;
 a flame-retardant agent selected from metal hydroxides; and
 a coupling agent forming an interface between the matrix and the flame-retardant agent;
wherein the matrix comprises at least 50% by mass of at least one biopolymer, and the coupling agent consists of a copolymer of ethylene and vinyl acetate (EVA), comprising at least 40% by mass of vinyl acetate (VA), grafted with maleic anhydride.
Electrical installation box or electrical cable tube, conduit, comprising said material.
Use of said material for manufacturing electrical installation boxes or electrical cable tubes.

18 Claims, 1 Drawing Sheet

FLAME-RETARDANT MATERIAL COMPRISING A BIOPOLYMER

FIELD OF THE INVENTION

The invention relates to a flame-retardant material comprising a biopolymer, more precisely a thermoplastic biopolymer, also referred to as a bioplastic.

More specifically, the invention relates to a flame-retardant material suitable for being moulded or extruded. This material comprises an organic matrix comprising at least 50% by mass of at least one biopolymer, a flame-retardant agent selected from metallic hydroxides (metal hydroxides), and a coupling agent forming as an interface between the matrix and the flame-retardant agent.

The material according to the invention particularly can be applied in electrical devices such as installation boxes and cable management systems.

PRIOR ART

Plastics, or more precisely thermoplastic polymers, are used in numerous industrial sectors and particularly in the electrical industry; the properties of these plastics have a considerable impact on the Product Environmental Profile, particularly on the $CO_2$ impact and the consequences thereof on global warming.

Moreover, these plastics, such as poly(ethylene) (PE), polyvinyl chloride (PVC), and polypropylene (PP) are mostly obtained from petroleum, and pose numerous problems particularly associated with the depletion of oil reserves, and the processing of wastes containing these substances.

The use of biopolymers or bioplastics, which does not involve any of the problems mentioned above has thus increased considerably. Note that the term biopolymer refers to a polymer obtained exclusively from living organisms, generally plants, or a polymer synthesised from renewable resources, generally plant-based. Biopolymers or bioplastics, are generally biodegradable and suitable for composting, and the waste thereof is readily disposable.

An example of such a bioplastic is poly(lactic acid) which is a plastic obtained by polymerising lactates particularly obtained by fermenting starch.

Although, at the present time, the price of bioplastics is higher than that of petroleum-based plastics, the price thereof can be expected to become competitive in the future.

For numerous uses of plastics, regardless of whether they are biodegradable or not, it is necessary to incorporate a flame-retardant agent therein.

In this way, the flame-retardant properties applicable to plastics used in electrical devices are defined by IEC ("International Electrotechnical Commission") standards such as the IEC 60695-2-1 standard.

The most commonly used flame-retardant agents are halogenated flame-retardant agents; however, these halogenated flame-retardant agents involve the major drawback of generating corrosive and toxic compounds such as dioxins during the combustion thereof, for example during the incineration of waste containing these substances and thus should be avoided.

Flame-retardant agents not containing halogens are, in particular, aluminium polyphosphate, and metal hydroxides such as aluminium trihydroxide (ATH). Compared to halogenated flame-retardant agents, metal hydroxides such as ATH have low fume, smoke, emissions and are not toxic. However, polymer compositions containing these compounds, even in very small quantities, have very insufficient mechanical properties, i.e. a very low mechanical resistance, strength, and a modulus in flexure less than 1000 MPa, making them unsuitable for many uses.

The document U.S. Pat. No. 4,525,494 mentions the use of aluminium trihydroxide (ATH) coated with fatty acid in polymer compositions with a high modulus in flexure. However, the cost of this coated flame-retardant agent is high. Moreover, coated flame-retardant agents cause a significant stress whitening effect in polymer compositions containing same.

To remedy this drawback, the document WO 01/51554 describes a flame-retardant polymer composition consisting of a polyethylene, one or a plurality of binder(s) including a flame-retardant agent such as aluminium trihydrate. At least 5% by weight of the polymers are modified with maleic anhydride. This polymer composition is used in the electrical industry.

The documents EP 1 544 250, EP 674 627, EP 1 795 561, US 2008/0108729, EP 1 816 169, EP 1 361 039, and WO 2008/058020 describe compositions wherein the non-plastic filler content is greater than 30%; the rigidity thereof is high but the flexibility thereof is very low with an elongation at break of less than 3%.

Such a flexibility is markedly insufficient to enable the use of these compositions in moulding or extrusion methods especially for preparing items suitable for use in the electrical industry.

There is thus a need for a flame-retardant material, i.e. complying with the IEC standard, IEC 60695-2-1 in force on 30 Mar. 2011 comprising a polymer matrix consisting partly or completely of a biopolymer, and a flame-retardant agent chosen from metal hydroxides such as aluminium trihydroxide (ATH), which has an enhanced flexibility with a greater elongation at break.

There is also a need for such a material having, in addition to a greater elongation at break, satisfactory mechanical properties represented for example by a high E-modulus and a high maximum strength (complying with ISO 527-1 and following).

There is also a need for such a material which can be readily moulded or extruded to prepare, in a simple, reliable and non-polluting manner, at a low cost, items, even of complex shapes, and particularly items used in the electrical industry such as installation boxes, cable management systems etc., these items being rigid and shock-resistant.

The goal of the invention is that of providing a flame-retardant material fulfilling, among other things, the needs listed above. The aim of the invention is also that of providing a flame-retardant material which does not have the drawbacks, failings, limitations and disadvantages of the compositions according to the prior art.

SUMMARY OF THE INVENTION

This goal and others are met, according to the invention, by a flame-retardant material comprising:
  a matrix comprising, preferably consisting of, at least one organic polymer;
  a flame-retardant agent selected from metal hydroxides; and a coupling agent acting as an interface between the matrix and the flame-retardant agent;
wherein the matrix comprises at least 50% by mass of at least one biopolymer, and the coupling agent consists of a copolymer of ethylene and vinyl acetate (EVA), comprising at least 40% by mass of vinyl acetate (VA), grafted with maleic anhydride.

This copolymer no longer having the typical properties of an EVA, and having a high vinyl acetate content may also be named EVM according to elastomer terminology.

The term flame-retardant material in the sense of the invention generally indicates that this material complies with the IEC-60695-2-1 standard in force on 30 Mar. 2011 (with a glow wire at 850° C. on a sheet, plate thickness greater than 1.5 mm).

Advantageously, the material has an elongation at break measured using the procedure specified in the ISO 527 standard in force on 30 Mar. 2011 greater than 4.5%.

Advantageously the ethylene and vinyl acetate copolymer comprises 55% to 75% by mass, for example 60% by mass, of vinyl acetate. An example of such a copolymer is the copolymer available from LANXESS™ as Levamelt™ 600.

Advantageously, the ethylene and vinyl acetate copolymer is grafted with maleic anhydride in a manner known in the art, at a ratio of 0.1% to 10% by mass for example.

Advantageously, the flame-retardant agent is selected from aluminium trihydroxide (ATH), magnesium hydroxide, calcium/aluminium hydrate, tin oxide hydrate or phlogopite, and mixtures thereof (see EP 1 544 250, WO 01/51554).

Generally, the flame-retardant agent is in the form of particles having a mean diameter ($d_{50}$) in the range from 0.1 to 10 µm, preferably in the range from 0.5 to 8 µm, more preferably in the range from 1 to 5 µm.

Advantageously, the biopolymer is selected from poly(lactic acid) PLA and polyester biopolymers other than poly(lactic acid).

The term poly(lactic acid) refers to all types of polylactic acid. The term polylactic acid covers poly(L-lactic acid) or PLLA consisting of L-lactic acid structural units, poly(D-lactic acid) or PDLA consisting of D-lactic acid structural units, or poly(DL-lactic acid) consisting of D-lactic acid and L-lactic acid structural units, and mixtures of two or more thereof.

The proportion of D isomers and L isomers of the poly(lactic acid) used according to the invention is generally such that the ratio between the two isomers is preferably from 100:0 to 90:10; more preferably, this ratio is from 0.5:99.5 to 6:94.

The term poly(lactic acid) also refers to copolymers of lactic acid with another monomer selected for example from α-hydroxycarboxylic acids, aliphatic diols, and aliphatic dicarboxylic acids.

The biodegradable polyesters also referred to as bioplastic polyesters other than poly(lactic acid) may be selected from biodegradable aliphatic polyesters and biodegradable aliphatic aromatic polyesters other than poly(lactic acid). Examples of biodegradable aliphatic polyesters other than poly(lactic acid) include aliphatic polyesters obtained by condensing an aliphatic diol and an aliphatic dicarboxylic acid, polyesters obtained by ring-opening polymerization of cyclic lactones, synthetic aliphatic polyesters, and the like. A particular example of such a biodegradable polyester or bioplastic polyester is poly(butylene succinate) (PBS).

Examples of biodegradable aliphatic aromatic polyesters include aliphatic aromatic polyesters comprising an aromatic dicarboxylic acid constituent, an aliphatic dicarboxylic acid constituent, and an aliphatic diol constituent.

Advantageously, the biopolymer of the matrix consists of poly(lactic acid).

Advantageously, the matrix comprises at least 60% by mass of at least one biopolymer, preferably the matrix comprises at least 90% by mass of at least one biopolymer, or even consists of one or a plurality of biopolymer(s) such as poly(lactic acid).

Alternatively, the matrix may further comprise one or a plurality of other polymer(s) which are not biopolymers in order to reduce the biodegradability of the material and/or to enhance some of the properties of the material. Examples of such polymers are polycarbonates, Acrylonitrile-Butadiene-Styrene copolymers (ABS), polystyrenes, and polypropylenes.

Advantageously, the matrix represents from 35% to 75% by mass, preferably from 50% to 65% by mass of the total material mass.

Advantageously, the flame-retardant agent represents from 25% to 65% by mass, preferably from 35% to 50% by mass of the total material mass.

Advantageously, the coupling agent represents from 1% to 25% by mass, preferably from 4% to 10% by mass of the total material mass.

Besides the flame-retardant agent, the material according to the invention may comprise one or a plurality of additive(s) and/or filler(s). In this way, the material according to the invention may further comprise at least one anti-ultraviolet stabilising agent (UV-stabilizer) such as Chimassorb™ from Ciba Specialty Chemicals.

The material according to the invention may further comprise at least one colouring substance selected from dyes and pigments to give the material the desired colour.

The material according to the invention may further comprise at least one anti-hydrolysis additive to prevent the hydrolysis of the material and enhance the long-term stability thereof. Such an anti-hydrolysis agent may be selected from polycarbodiimides such as Stabaxol™ or RHENOGRAN™ from Rhein-Chemie™.

Obviously, the fillers and additives mentioned above are merely given as examples. Further fillers and additives may be included in the material according to the invention and may be readily selected by the man skilled in the art in view of the properties sought in the material.

Advantageously, the material according to the invention may consist (be composed), in percentages by mass, of 45% to 65% of at least one biopolyester such as poly(lactic acid), 30% to 45% of at least one metal hydroxide such as aluminium trihydroxide, 6% to 8% of coupling agent, and optionally one or a plurality of additive(s) and/or filler(s), the total percentage by mass of the biopolyester, the metal hydroxide, the coupling agent and of the additive(s) and/of filler(s) being 100% by mass.

Advantageously, the material according to the invention may be prepared by mixing the organic polymer, the flame-retardant agent, the coupling agent, and optionally one or a plurality of additive(s) and/or filler(s) homogeneously, preferably by means of an extrusion mixing method.

The flame-retardant material according to the invention has not been previously described in the prior art; it particularly differs from the flame-retardant materials according to the prior art in that it comprises a specific coupling agent, consisting of an ethylene and vinyl acetate copolymer comprising at least 40% by mass of vinyl acetate, grafted with maleic anhydride. As mentioned above, a preferred EVA copolymer comprises from 55% to 75% vinyl acetate, for example 60% vinyl acetate. This proportion of VA is markedly superior to that of standard EVAs only containing approximately 30% EVA.

The material according to the invention does not have the drawbacks, failings, limitations and disadvantages of the flame-retardant materials according to the prior art, particularly flame-retardant materials according to the prior art based on biopolymers containing metal hydroxides as flame-retardant agents.

The material according to the invention solves the basic problem of the flame-retardant materials according to the prior art, which is that of the insufficient flexibility thereof. More specifically, the elongation at break of the flame-retardant material according to the invention is significantly enhanced with respect to the elongation at break of flame-retardant materials according to the prior art. It was surprisingly observed that the material according to the invention generally had an elongation at break greater than 4.5%, which is very markedly greater than the elongation at break values of materials according to the prior art.

In addition to this excellent and unexpected flexibility, the material according to the invention has, overall, excellent mechanical properties, for example a Young's modulus, E-modulus greater than 1900 MPa and a maximum strength (stress at break) greater than 20 MPa.

The excellent and surprising flexibility of the material according to the invention is demonstrated in the examples given hereinafter wherein over fifty formulations were tested, including numerous formulations described in patent applications and in the literature and four formulations according to the invention. Surprisingly, it was found that, of all the formulations tested, only the formulations according to the invention were suitable for obtaining an excellent flexibility with an elongation at break greater than 4.5%.

Without intending to be linked with any theory, it can be considered that, according to the invention, it was possible to obtain a surprisingly flexible flame-retardant material through the use in this material of a specific coupling agent which, due to the particular composition and structure thereof, imparts an excellent flexibility to the organic matrix and, at the same time, provides coupling between the matrix and the mineral flame-retardant agent which, according to the invention, is not treated.

Indeed, in the coupling agent according to the invention, it was found that the EVA copolymer imparted excellent flexibility to the organic matrix and particularly to the constituent biopolymers thereof, such as PLA, whereas grafting with maleic anhydride provided satisfactory coupling with the metal hydroxide.

Similar results may be obtained with other polar copolymers, such as ethylene butyl, methyl or ethyl acrylate (EBA, EMA, EEA), grafted with maleic anhydride.

Furthermore, the high content of vinyl acetate, which is the polar component of EVA ensures excellent mixing with the organic matrix and particularly with the constituent biopolymers thereof, such as EVA.

In the material according to the invention, when mixing the various constituents for example by extrusion, the coupling agent binds with (attaches to) the surface of the flame-retardant agent via maleic anhydride functions of the coupling agent.

The coupling agent thus forms a flexible interface between the flame-retardant agent and the organic polymer matrix, more specifically between each of the flame-retardant agent particles and the organic polymer matrix. Furthermore, the coupling agent imparts flexibility properties to the matrix. For example, the material according to the invention has a markedly higher elongation at break than that of pure PLA (approximately 3%) whereas it may contain significant quantities of metal hydroxide flame-retardant agent of up to 40%, or even 50% by mass, for example.

The raw materials of the material according to the invention are readily available and the cost thereof is moderate. The material according to the invention is non-toxic particularly in that the flame-retardant agent contained therein is selected from metal hydroxides such as ATH which do not contain halogens and do not generate toxic gases.

The raw material of the matrix is entirely or mainly of biological origin (biopolymer) and has a low impact on greenhouse gas emission. Since bioplastics from the material according to the invention are biodegradable and metal hydroxides are non-toxic, the material according to the invention can be classified as a recyclable material.

The material according to the invention is suitable for manufacturing, flame-retardant products, items at a reasonable price and in a non-polluting and environmentally-friendly manner particularly with low greenhouse gas emission.

Due to the excellent mechanical properties thereof and particularly the excellent flexibility thereof, it is possible with the material according to the invention to manufacture injection-moulded and/or extruded items, such as electrical equipments, installation boxes or electrical installation devices such as lines, conduits, and cable management systems, trunkings, cable tubes and cable conduits which have flame-retardant properties and which are flexible and shock-resistant.

The material according to the invention may be prepared by mixing the raw materials intended to form the material, i.e. the organic polymer, the flame-retardant agent and the coupling agent generally at a high temperature above the softening point of the polymers, until a homogeneous mixture of these raw materials is obtained.

Advantageously, all the constituents were dried before processing, for example in a vacuum oven at 60° C. for 6 hours.

In general, the process starts by mixing or kneading the polymer(s) and then adding the other raw materials thereto. This mixing may be carried out in any type of mixer, for example an extruder or a batch blender. This mixing may be carried out preferably by means of an extrusion mixing method in an extruder as shown in FIG. 1.

This extruder comprising a first hopper (1) through which the feed of the polymer(s) of the material according to the invention is carried out. This hopper (1) opens into a first feed zone (2) of the sheath (3) of the extruder wherein the endless extrusion screw (4) is rotated.

The sheath (3) of the extruder is generally heated to a temperature above the softening point of the polymer(s), for example to a temperature from 150° C. to 190° C.

The polymer(s) is/are conveyed by the extrusion screw and successively undergo(es) compression in a first compression area (5), then a first kneading in a first kneading area (6) before reaching a second feed area (7) which is supplied by a second hopper (8) with the filler(s) intended to be incorporated in the material according to the invention.

The material thus comprising the polymer(s) supplemented with the filler(s) is conveyed by the extrusion screw (4) into a second compression area (9) then into a second kneading area (10) then into a third compression area (11) before being discharged from the extruder via a die (12).

A vacuum is produced in the extruder sheath by means of a connection piece, tapping, (13).

The metal hydroxide is generally introduced into the hopper (8), and the coupling agent into the hopper (1). The additives may be introduced either into the hopper (1), or into the hopper (8) according to the type of additive.

At the outlet of this extruder, the material according to the invention is generally in the form of granules or pellets. It may then be used for preparing various items of all possible sizes and shapes. These items inherently have all the advantageous properties of the material from which they were prepared.

These items may be prepared by any plastics technology method, for example by moulding or by extrusion, particularly by injection moulding or by profiles extrusion. In particular, these items may be used in the electrical industry, in applications wherein flame-retardant properties are important. These items, parts, objects may be items, parts, objects according to the invention, for applications in cable management systems such as installation boxes and electrical cabinets, trunkings, cable conduits or electrical apparatus boxes or housings such as sockets, circuit breakers, switches or electronic devices such as sensors and regulators.

In this way, the invention also relates to an electrical installation (e.g. switchgear) box or an electrical cable, tube, conduit, comprising a material according to the invention as described above.

Due to the material according to the invention, these items have a considerably better environmental profile than items prepared from materials according to the prior art and are recyclable or suitable for composting.

The invention thus further relates to the use of the material according to the invention for manufacturing electrical installation boxes or electrical cable tubes, conduits.

The invention will be understood more clearly on reading the following description of the embodiments of the invention in the form of examples describing materials according to the invention, and comparative examples describing materials not according to the invention and providing test results particularly for elongation at break tests conducted on these materials according or not according to the invention.

Figure 1:
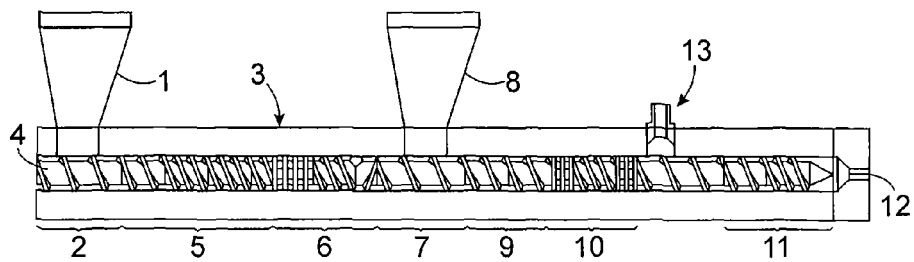
FIG. 1, described above, is a sectional side view of an extruder mixer used for preparing the materials according to the invention.

For each of the four materials A048, A049, A050, and A051, the three bars (I+2 days; I+12 days; and I+1 month) give elongation at break values for elongation tests conducted two days, 12 days and one month after preparing the material, respectively.

DETAILED DESCRIPTION OF PARTICULAR EMBODIMENTS

Examples

Hereinafter, materials are prepared from compositions or formulations, identified by the reference AXX.

These materials are prepared by extrusion mixing as described above, and are in granule form. To obtain the standardised properties, the dried granules were converted into test specimens, draw bars of the type defined in the ISO 527-1A standard (in force on 30 Mar. 2011).

Firstly, materials are simply prepared from formulations consisting of PLA and ATH as the flame-retardant agent in a variable proportion ranging from 10% to 40% by mass.

Mechanical tests (ISO 527) and a fire-resistance test (IEC-60695-2-1 in force on 30 Mar. 2011) at 850° C. with a sheet thickness of 1 mm and 2 mm were carried out on these materials: the material comprising 30% by mass of ATH has self-extinguishing properties; however, the materials obtained are very brittle with an elongation at break below 1%.

A copolymer (EVA 1: EVA with a VA content of 27.5%) available as Escorene™ 02528 CC from Exxon Mobil) and a grafted copolymer (EVA-MAH1: EVA with a VA content of 28%, grafted with maleic anhydride, available as Fusabond™ C 190 from DuPont™) are added to the formulation to enhance the flexibility of the material. This technology is known in the technical field in order to obtain a satisfactory interface between the plastic matrix and the metal hydroxide filler.

The two copolymer materials were each tested independently, and in combination with percentages ranging from 3% to 20% by mass in the formulation.

The materials tested in this way are materials prepared from the formulations named A016, A014, A013, and A018.

The formulations and the results of the mechanical tests and the fire-resistance test carried out on materials prepared from these formulations are given in Table 1 below.

TABLE 1

|  | A016 | A014 | A013 | A018 |
|---|---|---|---|---|
| PLA | 57% | 60% | 65% | 54% |
| ATH 1 | 40% | 30% | 30% | 40% |
| EVA 1 | 3% | 5% | 0% | 6% |
| EVA-MAH 1 | 0% | 5% | 5% | 0% |
| Elongation at break ("Er") | 0.76% | 1.55% | 1.13% | 0.93% |
| E-Modulus | 7722 MPa | 2584 MPa | 3826 MPa | 6570 MPa |
| Maximum strength | 56 MPa | 25 MPa | 35 MPa | 51 MPa |
| Fire test | Pass | Fail | Fail | Pass |

PLA: Natureplast™ PLI003 from Natureplast™
ATH 1: Alolt™ 59AF, from Magyar Alumina™
EVA 1: Escorene™ 02528CC from Exxon Mobil™, EVA with a VA content of 27.5%.
EVA-MAH 1: Fusabond™ C190 from DuPont™, EVA with a VA content of 28%, grafted with maleic anhydride MAH.

The best results in terms of flexibility are obtained with the material prepared from the formulation (A014) consisting of 5% EVA, 5% EVA grafted with maleic anhydride, 30% ATH and 60% PLA with an elongation at break value of 1.55%, which is still not sufficient, however.

The conclusion is that EVA 1 and EVA-MAH 1 do not impart enough flexibility to the formulation (formulations A013, A014, A016, A018).

To obtain a more flexible polymer, known flexibility additives were tested such as Biomax Strong™ 120 available from DuPont™, and a PBS (PBS 1) available from Natureplast™ SA as Natureplast™ PBI 003, but many others are known in the industry.

The materials tested in this way are materials prepared from the formulations named A022, A019, A020, and A035.

The formulations and the results of the mechanical tests and the fire-resistance test carried out on materials prepared from these formulations are given in Table 2 below.

TABLE 2

|  | A022 | A019 | A020 | A035 |
|---|---|---|---|---|
| PLA | 95% | 57% | 54% | 45% |
| ATH 1 | 0% | 40% | 40% | 40% |
| Biomax™ Strong 120 | 5% | 3% | 6% | 0% |
| PBS 1 | 0% | 0% | 0% | 15% |

TABLE 2-continued

|  | A022 | A019 | A020 | A035 |
|---|---|---|---|---|
| Elongation at break ("Er") | 127% | 0.81% | 0.76% | 0.85% |
| E-Modulus | 3033 MPa | 8704 MPa | 7120 MPa | 6391 MPa |
| Maximum strength | 56 MPa | 56 MPa | 49 MPa | 45 MPa |

PBS 1: Natureplast ™ PBI 003 biodegradable polyester from Natureplast ™ SA.

It was demonstrated that adding Biomax Strong™ 120 to PLA increases the elongation at break of the material prepared from this formulation from 3% to 127% (A022). However, adding metal hydroxide to PLA comprising known flexibility additives, for example PLA supplemented with Biomax™ Strong 120, destroys all the flexibility properties of the material and the elongation at break drops hugely to less than 1% (A019-A020 and A035).

Combining known flexibility additives (Biomax Strong™ 120, PBS) with coupling agents grafted with maleic anhydride (EVA-MAH 1: Fusabond™ C190) in PLA also does not solve the problem (Formulations A021, A028: see Table 3 below).

Biomax Strong™ was also tested combined with Stabaxol™ P, an anti-hydrolysis agent described in the patent EP-B1-1 544 250. Although the reduction in the molecular mass is somewhat lower, the material is still brittle (Formulation A024: see Table 3 below).

TABLE 3

|  | A021 | A028 | A024 |
|---|---|---|---|
| PLA | 54% | 48% | 52% |
| ATH 1 | 40% | 40% | 40% |
| Biomax ™ Strong 120 | 3% | 6% | 3% |
| EVA-MAH 1 | 3% | 6% | 0% |
| Stabaxol ™ P | 0% | 0% | 5% |
| Elongation at break ("Er") | 1.14% | 1.32% | 1.22% |
| E-Modulus | 3109 MPa | 1438 MPa | 2670 MPa |
| Maximum strength | 27 MPa | 17 MPa | 23 MPa |
| Fire test | Fail | Fail | Fail |

Stabaxol ™ P, RHENOGRAN ™ PCD-50/EVA, from Rhein-Chemie ™, polycarbo-diimide anti-hydrolysis agent.

Various types of ATH, including products of submicronic size (Apyral™ 200SM from Nabaltec™) which are precipitated (Apyral™ 60CD, Apyral™ 200SM from Nabaltec™) from a solution rather than being ground, were tested without any positive impact on the elongation at break (Formulations A030-A033: see Table 4 below)

TABLE 4

|  | A028 | A031 | A033 | A036 |
|---|---|---|---|---|
| PLA | 48% | 48% | 48% | 54% |
| ATH 1 | 40% | 0% | 0% | 0% |
| ATH 2 | 0% | 40% | 33% | 0% |
| ATH 3 | 0% | 0% | 7% | 0% |
| ATH 4 | 0% | 0% | 0% | 40% |
| BiomaxTM Strong 120 | 6% | 6% | 6% | 6% |
| EVA-MAH 1 | 6% | 6% | 6% | 0% |
| Elongation at break ("Er") | 1.32% | 1.13% | 0.57% | 0.31% |
| E-Modulus | 1439 MPa | 1621 MPa | 2836 MPa | 4556 MPa |

TABLE 4-continued

|  | A028 | A031 | A033 | A036 |
|---|---|---|---|---|
| Maximum strength | 17 MPa | 15 MPa | 12 MPa | 16 MPa |

ATH 2: Apyral ™ 60CD from Nabaltec ™
ATH 3: Apyral ™ 200SM from Nabaltec ™
ATH 4: Apyral ™ 60 VS1 from Nabaltec ™, ATH with vinylsilane coating.

Coated metal hydroxides (such as those described in the patent EP-B1-1 544 250) and known flexibility additives (Biomax Strong™ 120, PBS) were then tested with PLA to overcome the problem.

In this way, the formulation A036 mentioned in Table 4 contains APYRAL™ 60 VS 1 from NABALTEC™ which is an ATH treated with vinylsilane. The elongation at break of the material prepared from this formulation is below 0.5%.

A further ATH (ATH 5) provided with another coating (fatty acid) available from HUBER™ in the United States, as Hymod™ SB-432 ST1 also produced poor results (Formulation 041 in Table 5 below).

Although these metal hydroxides having undergone a surface treatment produce a satisfactory interface between the matrix and the coated metal hydroxide, they do not impart the sought flexibility to the matrix.

TABLE 5

|  | A028 | A041 |
|---|---|---|
| PLA | 48% | 54% |
| ATH 1 | 40% | 0% |
| ATH 5 | 0% | 40% |
| Biomax ™ Strong 120 | 6% | 6% |
| EVA-MAH 1 | 6% | 0% |
| Elongation at break ("Er") | 1.32% | 0.91% |
| E-Modulus | 1439 MPa | 4751 MPa |
| Maximum strength | 17 MPa | 24 MPa |

ATH 5: Hymod ™ SB-432 ST1 from Huber ™, ATH with a fatty acid coating.

It is thus noted, in view of the test results given above, that all the methods described above and known in the prior art did not provide the composition with sufficient flexibility.

Levamelt™ 600 is an EVA with a VA content of 60%. This content is greater than that of standard EVA which has a VA content of 30%; in the rubber industry, this compound is called EVM due to the rubbery properties thereof.

Adding, at a rate of 6% or 8% by mass, Levamelt™ 600 grafted with maleic anhydride in the formulations A048 to A051 (see Table 6 below) produces a material according to the invention with an astonishingly good elongation at break.

TABLE 6

|  | A048 | A049 | A050 | A051 |
|---|---|---|---|---|
| PLA | 51.5% | 49.0% | 49.5% | 47% |
| ATH 1 | 42.5% | 45% | 42.5% | 45% |
| EVA-MAH 2 | 6% | 6% | 8% | 8% |
| Elongation at break ("Er") | 4.69% | 5.01% | 6.97% | 6.74% |
| E-Modulus | 2153 MPa | 2401 MPa | 2012 MPa | 1996 MPa |
| Maximum strength | 26 MPa | 24 MPa | 24 MPa | 22 MPa |
| Fire test | Pass | Pass | Pass | Pass |

EVA-MAH 2: Levamelt ™ 600 from Lanxess ™, EVA with a VA content of 60%, grafted with maleic anhydride MAH.

For comparison purposes, mechanical resistance tests and fire resistance tests are carried out on 4 materials not according to the invention prepared from formulations A015, A018, A020, and A028.

The formulations and the test results are given in Table 7 below.

TABLE 7

|  | A015 | A018 | A020 | A028 |
|---|---|---|---|---|
| PLA | 64% | 54% | 54% | 48% |
| ATH 1 | 30% | 40% | 40% | 40% |
| EVA 1 | 6% | 6% | 0% | 0% |
| EVA-MAH 1 | 0% | 0% | 0% | 6% |
| Biomax Strong ™ 120 | 0% | 0% | 6% | 6% |
| Elongation at break ("Er") | 1.03% | 0.93% | 0.76% | 1.32% |
| E-Modulus | 5505 MPa | 6570 MPa | 7120 MPa | 1438 MPa |
| Maximum strength | 52 MPa | 51 MPa | 49 MPa | 17 MPa |
| Fire test | Pass | Pass | Fail | Fail |

PLA: Natureplast ™ PLI003 from Natureplast ™
ATH 1: Alolt ™ 59AF from Magyar Alumina ™
EVA 1: Escorene ™ 02528CC from Exxon Mobil ™, EVA with a VA content of 27.5%.
EVA-MAH 1: Fusabond ™ C190 from DuPont ™, EVA with a VA content of 28%, grafted with maleic anhydride MAH.
Biomax Strong ™ 120 from DuPont ™.

Figure 2:
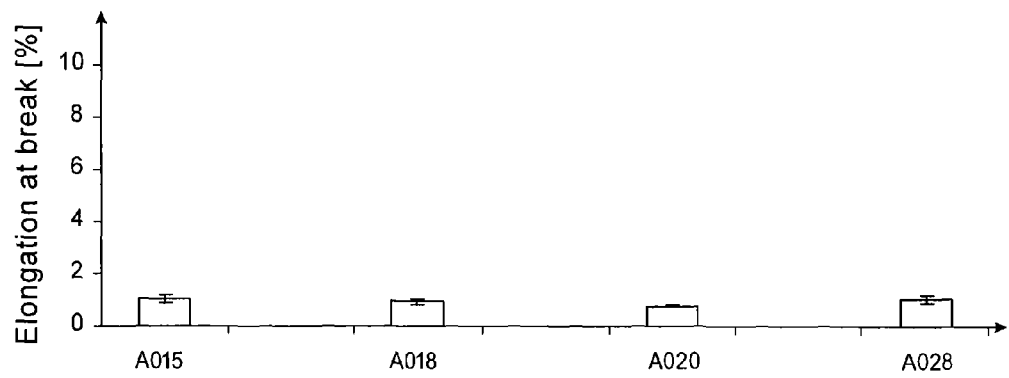
FIG. 2 is a graph showing the elongation at break (as a %) of four materials not according to the invention prepared from formulations named A015, A018, A020, and A028 (see Table 7) comprising 6% EVA and Biomax™ Strong 120 available from DuPont™ which is a flexibility-modifying agent.

Although the flame-retardant filler (ATH) content is lower in formulations A015, A018 and A020 than in formulations A048 to A051 according to the invention, the elongation at break remains very low for these formulations, producing a brittle "plastic" (see FIG. 2).

Figure 3:
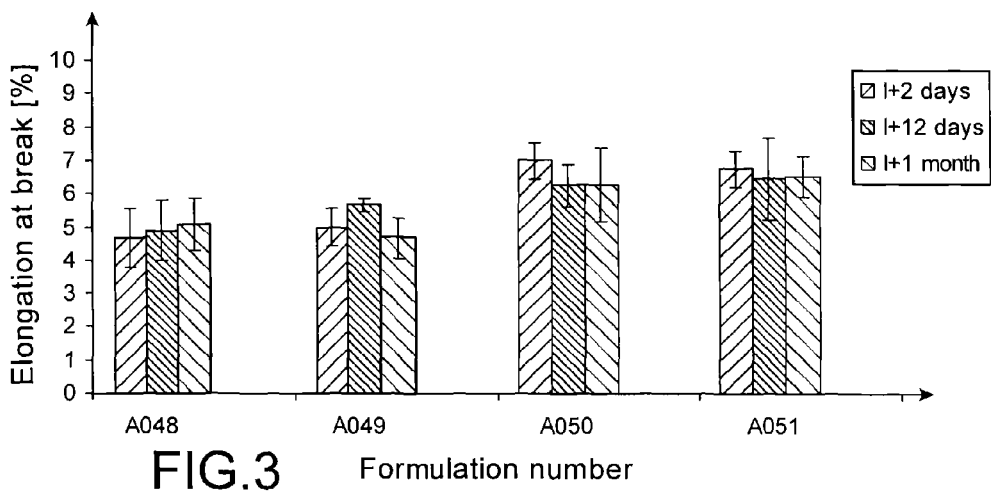
FIG. 3 is a graph showing the elongation at break (as a %) of four materials according to the invention prepared from formulations named A048, A049, A050, A051 (see Table 6).

On the other hand, EVA-MAH 2 has a surprisingly strong effect on the elongation at break, since the material prepared from the formulations A048 to A051 containing EVA-MAH 2 exhibits an increase of approximately 500% in the elongation at break as seen in FIG. 3.

With formulations A048 to A051 containing EVA-MAH 2, the materials (according to the invention) are no longer brittle at all.

The invention claimed is:

1. A flame-retardant material, comprising:
a matrix comprising an organic polymer;
a flame-retardant agent comprising a metal hydroxide; and
a coupling agent forming an interface between the matrix and the flame-retardant agent;
wherein:
the matrix comprises at least 90% by mass of a biopolymer; and
the coupling agent consists of a copolymer of ethylene and vinyl acetate (EVA), said copolymer comprising at least 40% by mass of vinyl acetate (VA), grafted with maleic anhydride.

2. The material of claim 1, which complies with the IEC-60695-2-1 standard.

3. The material of claim 1, having an elongation at break of greater than 4.5%, as measured using the procedure specified in the ISO 527 standard.

4. The material of claim 1, wherein the coupling agent comprises 55% to 75% by mass of vinyl acetate.

5. The material of claim 1, wherein the metal hydroxide is selected from the group consisting of aluminium trihydroxide, magnesium hydroxide, calcium/aluminium hydrate, tin oxide hydrate, phlogopite, and mixtures thereof.

6. The material of claim 1, wherein the biopolymer is selected from the group consisting of poly(lactic acid) and a polyester biopolymer other than polylactic acid.

7. The material of claim 1, wherein the matrix further comprises an additional polymer which is not a biopolymer.

8. The material of claim 1, comprising from 35% to 75% by mass of the matrix, relative to a total mass of the material.

9. The material of claim 1, comprising from 25% to 65% by mass of the flame-retardant agent, relative to a total mass of the material.

10. The material of claim 1, comprising from 1% to 25% by mass of the coupling agent, relative to a total mass of the material.

11. The material of claim 1, further comprising an additive, a filler, or both.

12. The material of claim 1, consisting of in percentages by mass:
45% to 65% of at least one biopolyester;
30% to 45% of at least one metal hydroxide;
6% to 8% of the coupling agent; and
optionally an additive, a filler, or both,
such that a total percentage by mass equals 100%.

13. An electrical installation box or electrical cable tube, comprising the material of claim 1.

14. A method of imparting flame-retardant properties to an article, the method comprising adding the material of claim 1 to at least one component of the article, wherein the method is suitable for manufacturing electrical installation boxes or electrical cable tubes.

15. The material of claim 1, wherein the flame-retardant agent consists of a metal hydroxide.

16. The material of claim 1, wherein the matrix further comprises at least one additional polymer selected from the group consisting of a polycarbonate, an acrylonitrilebutadiene-styrene copolymer, a polystyrene and a polypropylene.

17. The material of claim 1, comprising from 50% to 65% by mass of the matrix, relative to a total mass of the material.

18. The material of claim 1, comprising from 35% to 50% by mass of the flame-retardant agent, relative to a total mass of the material.

* * * * *